Dec. 15, 1970   W. J. HALL   3,547,519
PORTABLE VIEWING ACCESSORY FOR A SLIDE PROJECTOR
Filed Jan. 29, 1968   4 Sheets-Sheet 1
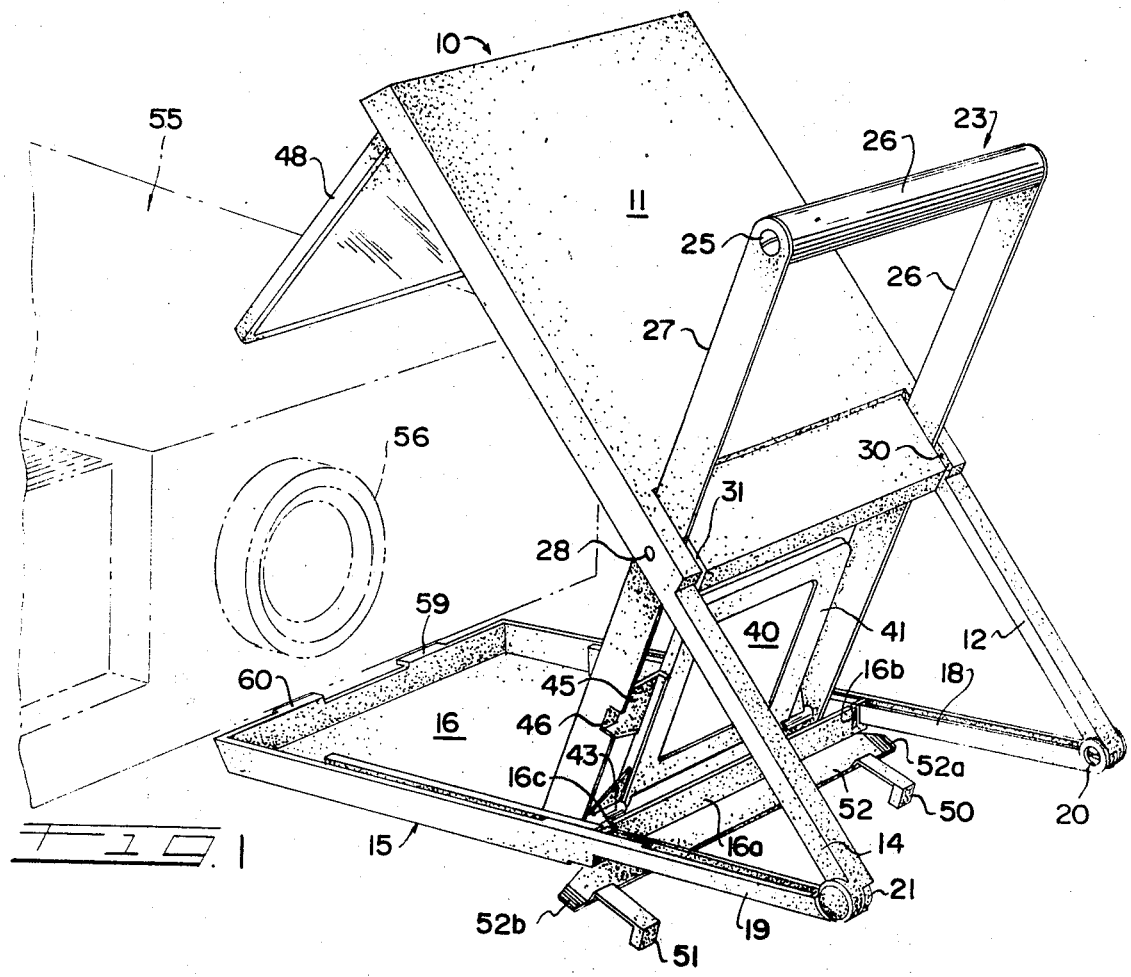
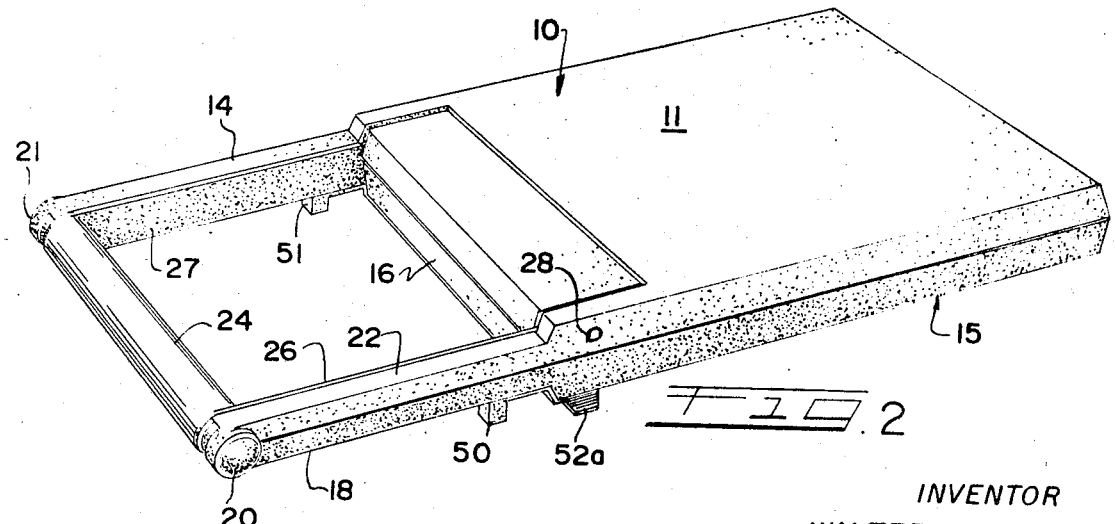
INVENTOR
WALTER J. HALL
BY Greist, Lockwood,
Greenawalt & Dewey
ATT'YS.

Dec. 15, 1970   W. J. HALL   3,547,519
PORTABLE VIEWING ACCESSORY FOR A SLIDE PROJECTOR
Filed Jan. 29, 1968   4 Sheets-Sheet 2
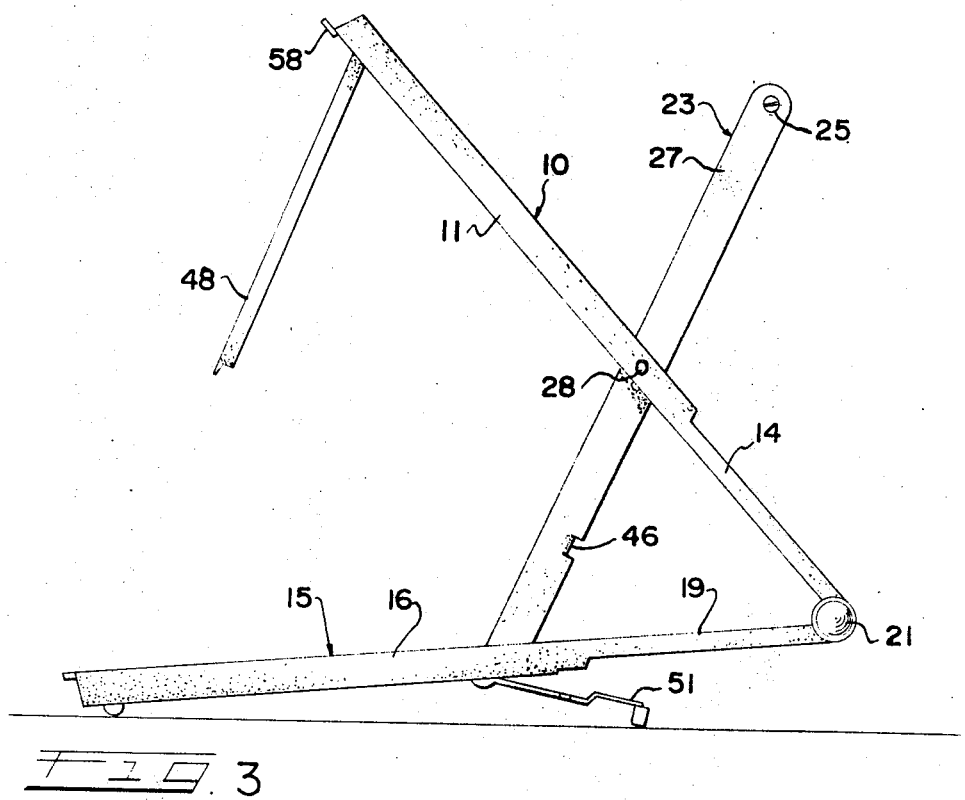
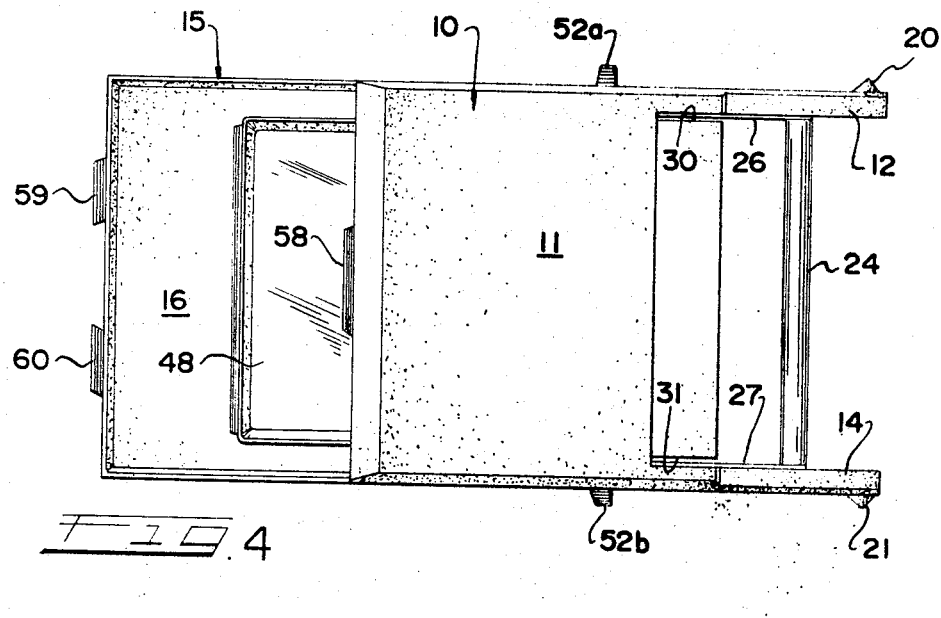
INVENTOR
WALTER J. HALL
BY Greist, Lockwood,
Greenawalt & Dewey.
ATT'YS.

Dec. 15, 1970   W. J. HALL   3,547,519
PORTABLE VIEWING ACCESSORY FOR A SLIDE PROJECTOR
Filed Jan. 29, 1968   4 Sheets-Sheet 3
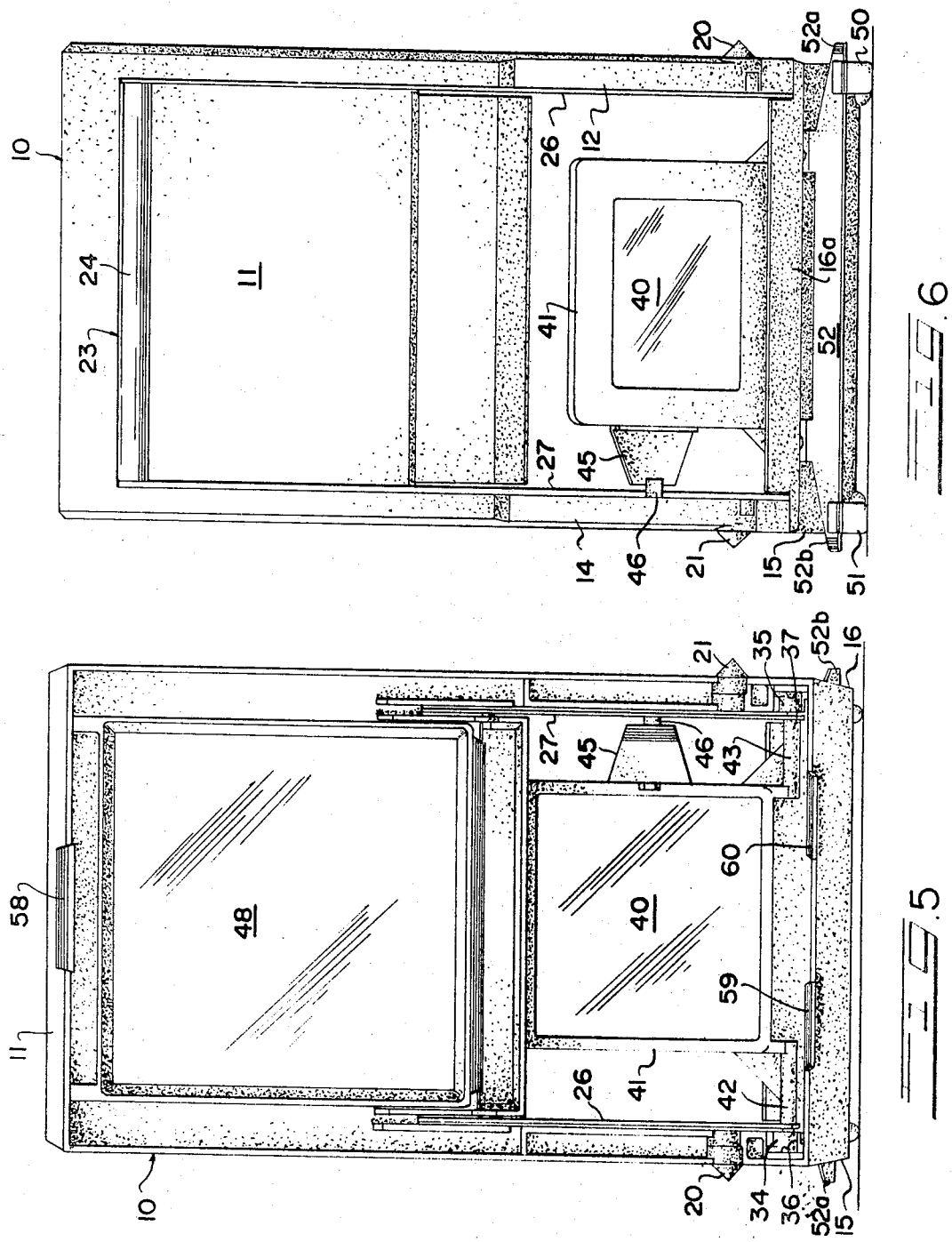
INVENTOR
WALTER J. HALL
BY Grist, Lockwood,
Greenawalt & Dewey
ATT'YS.

Dec. 15, 1970　　　　　W. J. HALL　　　　　3,547,519
PORTABLE VIEWING ACCESSORY FOR A SLIDE PROJECTOR
Filed Jan. 29, 1968　　　　　　　　　　　　4 Sheets-Sheet 4
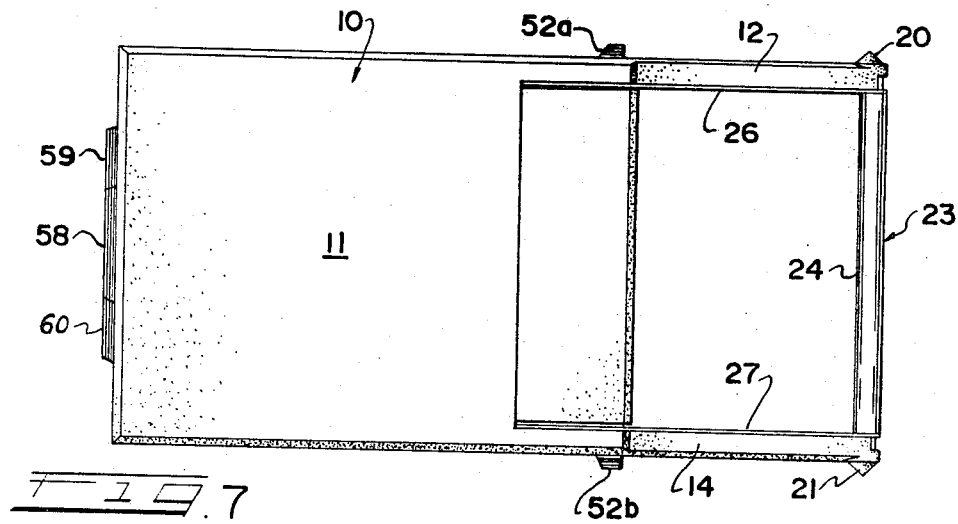
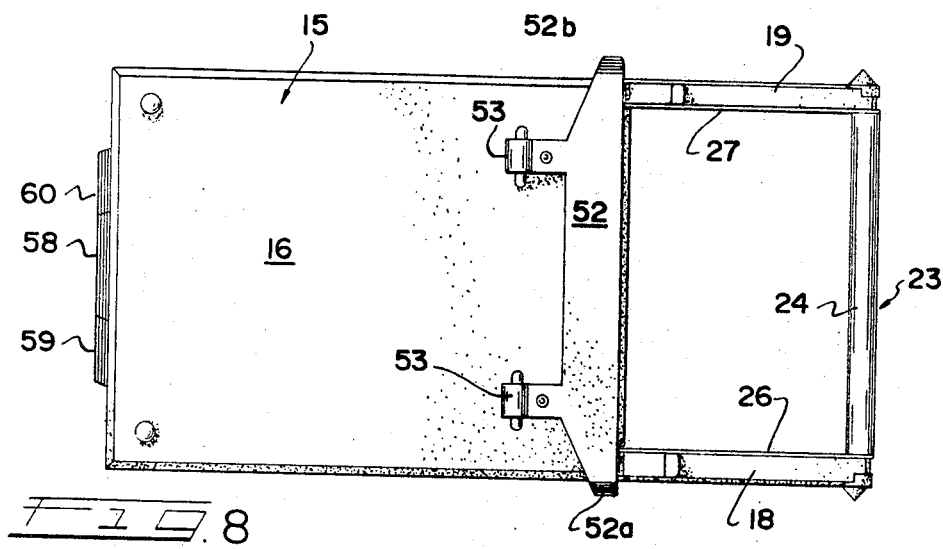
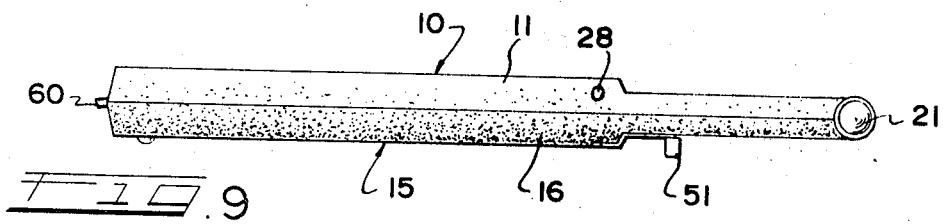
INVENTOR
WALTER J. HALL
BY Greist, Lockwood,
Greenawalt & Dewey
ATT'YS.

United States Patent Office 3,547,519
Patented Dec. 15, 1970

3,547,519
PORTABLE VIEWING ACCESSORY FOR
A SLIDE PROJECTOR
Walter J. Hall, Chicago, Ill., assignor to GAF Corporation, New York, N.Y., a corporation of Delaware
Filed Jan. 29, 1968, Ser. No. 701,386
Int. Cl. G03b 21/56
U.S. Cl. 350—123
4 Claims

ABSTRACT OF THE DISCLOSURE

The portable viewing accessory includes a plurality of frame members pivotally connected with each other for swinging movement back and forth between nested and spread positions thereby establishing a collapsed and an erected configuration of the accessory. The frame members pivotally mount a rear projection screen and a mirror. In the collapsed configuration of the accessory, the screen and mirror are contained within a substantially enclosed housing defined by the frame members thereby making the accessory compact for convenient carrying and storage. In the erected configuration, the accessory is supported on a suitable surface in front of a projector, such as a slide projector. The mirror intercepts the projector optical axis at an oblique angle and reflects an image to the rear of the rear projection screen. In the erected configuration of the accessory, the mirror may be pivoted to an inoperative position wherein the same is in non-interfering relation with the optical axis thereby permitting projection on a remote screen.

OBJECTS OF THE INVENTION

A primary object is the provision of a new and improved portable viewing accessory for a projector.

Another object of the present invention is the provision of a new and improved viewing accessory for a projector, which accessory may be readily collapsed into a compact unit for convenient carrying and storage.

Still another object of the present invention is the provision of a new and improved viewing accessory which may be readily erected for use with an associated projector.

Another object of the present invention is the provision of a new and improved viewing accessory for a slide projector, which accessory includes a movable reflecting element permitting alternate projecting of an image on a remote screen and a rear projection screen, the latter forming part of the viewing accessory.

These and other objects and advantages of the invention will become apparent from the following specification disclosing a preferred embodiment shown in the accompanying drawings.

DESCRIPTION OF THE DRAWINGS

FIG. 1 is a perspective view of the portable viewing accessory in the erected configuration thereof;

FIG. 2 is a perspective view showing the accessory in its collapsed configuration;

FIG. 3 is a side elevational view of the accessory in its erected configuration;

FIG. 4 is a top plan view of the erected viewing accessory;

FIG. 5 is a front elevational view showing the accessory in its erected configuration;

FIG. 6 is a rear elevational view of the erected accessory;

FIG. 7 is a top plan view of the accessory showing the same in its collapsed configuration;

FIG. 8 is a bottom plan view of the accessory in the collapsed configuration thereof; and FIG. 9 is a side elevational view showing the viewing accessory in its collapsed configuration.

DESCRIPTION OF A PREFERRED EMBODIMENT

The viewing accessory includes a first frame member, generally designated 10, which includes a thin-walled housing shell 11 in the form of a generally rectangular pan having a pair of parallel, spaced arms 12 and 14 extending integrally therefrom. A similar frame member, generally designated 15, includes a thin-walled housing shell 16 having a pair of integral, parallel spaced arms 18 and 19. The arms 12, 14 and the arms 18, 19 are pivotally connected to each other, respectively, by pivot connections 20, 21 which lie on a common axis; these connections serve to permit swinging movement of the frame members 10 and 15 relative to each other. As should be apparent from FIG. 2, when the frame members 10 and 15 are swung completely toward each other the rim surfaces of the shell housing portions 11 and 16 come into substantial coextensive contact for defining a substantially enclosed housing space.

The accessory includes another frame member, generally designated 23, which is of U-shape including a cylindrical sleeve 24 defining a handle, this sleeve being secured by means of fasteners 25 to corresponding ends of legs 26, 27. These legs are pivotally connected intermediate the ends thereof to the frame member 10 intermediate the ends of the latter, as by means of one or more pins 28. The shell portion 11 is slotted, as indicated at 30 and 31, to permit pivoting movement of the frame members 10 and 23 relative to each other.

As seen in FIGS. 1 and 5, the distal ends of the legs 26 and 27 are mounted to the frame member 15 by sliding pivots including pivot elements 34, 35 which are slidably received in suitable guideway surfaces 36, 37, respectively, formed in the shell portion 16. These sliding pivot connections permit sliding movement of the distal ends of the legs 26, 27 from the position shown in FIG. 1 to a position wherein such ends are adjacent the end of the shell portion 16 opposite the end thereof supporting the arms 18, 19; the legs 26, 27 pivot relative to the frame member 15 during such sliding movement. The frictional engagement between the elements 34, 35 and the guideways 36, 37 is sufficient to hold the frame member 23 in any desired position relative to the other frame members.

A mirror 40 is contained in a rectangular frame 41, the latter including integral, oppositely extending cylindrical portions 42, 43 pivotally mounting the frame 41 to the ends of the legs 26, 27 for swinging movement about an axis coaxial with the sliding pivots 34, 35. The frame 41 includes an integral tab 45 adapted for abutting engagement with a lug 46 struck from the leg 27 thereby to support the mirror 40 in the operative position illustrated in FIGS. 1, 5 and 6. It will be understood the mirror 40 can be moved to an inoperative position by pivoting the same relative to the legs 26, 27 until it comes to rest against the inside surface of the shell portion 16.

The viewing accessory according to the present invention further include a rear projection screen 48 which is of generally rectangular form and which is pivotally mounted to the shell 11 of the frame 10 by suitable hinge means (not shown) connected to the screen 48 along one side thereof and to the housing shell 11 adjacent the end thereof which is remote from the end including the arms 12, 14. It will be understood the screen 48 can be swung or pivoted relative to the frame member 10 until the screen comes to rest against the inside surface of the housing portion 11 whereupon the screen 48 will be contained within the housing space defined by the shells 11 and 16 when the latter are in confronting relation with rim edges thereof in substantial coextensive contact. The just mentioned hinge means are of the friction type and offer sufficient resistance to hinging movement such that the screen 48 will remain in any desired angular position relative to the frame member 10.

A pair of adjustable feet 50, 51 are integrally formed on a crossbar 52. This crossbar is pivotally connected to the shell 16 by appropriate hinge means 53 (FIG. 8). These hinge means are provided with friction means such that the feet 50, 51 will remain in any desired position relative to the frame member 15 for adjusting the angle of inclination of the accessory as best seen in FIG. 3. The feet 50, 51 may be readily adjusted and set relative to the frame member 15 by manual grasping of tabs 52a and 52b extending integrally from opposite ends of the bar 52.

In use, the viewing accessory is erected to the configuration shown in FIG. 1 and rested on a suitable surface in front of a projector, such as a slide projector shown in phantom lines and generally designated 55. This projector contains the usual means defining an optical axis which includes an adjustable objective lens assembly 56 of tubular form and having the longitudinal central axis thereof defining the optical axis of the projector. It should be apparent the mirror 41 will intercept the projector optical axis at an oblique angle thereto for reflecting an image to the rear of the screen 48. The feet 50, 51 are adjusted and the screen 48 is swung for properly framing the image on the rear of the screen 48. The focusing system within the projector 55 is used to bring the image into sharp focus on the screen 48. Of course focusing may also be achieved by adjusting the position of the accessory relative to the projector along the optical axis thereof.

If it is desired to use the projector 55 for projection on a remote screen (not shown) without changing the configuration of the accessory or without removing the same from its position in front of the projector, the operator grasps the tab 45 and swings the mirror 40 to an inoperative position within the shell 16. In such case, none of the other members of the viewer intercept the optical axis and therefore projection on a remote screen is permitted. It will be appreciated the viewing accessory may be used for viewing images by one or more persons located behind the projector 55. Alternatively, the operator of the projector 55, by swinging the mirror 40 back and forth between its operative and inoperative positions, may use the viewing accessory in the nature of a previewer, i.e., the operator himself may view an image on the screen 48 before projecting such image on a remote screen before other persons.

The viewing accessory may be readily collapsed into a compact unit for carrying and storing. This is achieved merely by swinging the screen 48 within the housing shell 11, and then forcing the frame members 10 and 15 toward each other. This will result in nesting of the frame member 23 within the frame members 10 and 15. To this end, it will be noted that the one side wall 16a (FIG. 1) of the shell 16 is notched at 16b and 16c to receive the arms 26, 27, respectively. The arms 18, 19 are of generally U-shaped cross-section and the arms 12 and 14 are of right angle cross-section, thereby to facilitate nesting of the latter within the former. It will be observed that when the accessory is in the collapsed configuration thereof, the longitudinal central axis of the handle or sleeve 24 is substantially coaxial with the pivot connections 20, 21. It will also be noted that handle 24 is accessible for grasping in both the erected and collapsed configurations of the accessory.

The accessory is erected from the collapsed configuration thereof merely by spreading the frame members 10 and 15 relative to each other. Opening or spreading of the frame members 10 and 15 is facilitated by providing the frame member 10 with a tab 58 and by providing the frame member 15 with a pair of spaced tabs 59, 60. In the collapsed configuration of the accessory, the tab 58 lies between the tabs 59, 60 thereby to provide a ready means for grasping by the operator's fingers to spread the frame members 10 and 15.

While the invention has been shown in but one form, it will be obvious to those skilled in the art it is not to be so limited. On the contrary, the invention is susceptible of various forms and modifications without departing from the spirit and scope of the appended claims.

I claim:

1. A portable viewing accessory for a projector comprising, frame means including first and second frame members pivotally connected to each other for relative swinging movement back and forth between adjacent and spread positions thereby establishing, respectively, collapsed and erected configurations of said accessory, said frame members in the adjacent position thereof solely defining a substantially closed, generally rectangular housing having a height substantially less than either the length or width thereof, a rear projection screen and a planar reflecting element each pivotally connected to said frame means, said screen and said element being pivotable to first positions, when said accessory is erected, whereby said element obliquely intersects the optical axis of an associated projector for reflecting an image to the rear of said screen, said screen and said element being pivotable to second positions for being enclosed within said housing when said accessory is collapsed, said frame means including a third frame member pivotally connected to said first and second frame members for nesting within said first and second frame members when the latter are in the adjacent position thereof, said third frame member including a handle portion.

2. The accessory according to claim 1 wherein each of said frame members is in the shape of a shallow, generally rectangular pan.

3. A portable viewing accessory for a projector comprising, first and second pan members each being of generally rectangular shape and having a pair of spaced, parallel arms extending from one end thereof in generally coplanar relation with the associated pan member, the pairs of arms of the first pan being pivotally mounted about a common axis to the pair of arms of the second pan thereby to permit swinging movement of the first and second pan members to and away from each other for establishing, respectively, a collapsed and erected configuration of the accessory, said pan members, in the collapsed configuration of the accessory, being in confronting relation with respective rim surfaces thereof in substantial coextensive contact thereby defining a substantially enclosed housing space, a generally U-shaped frame member having the legs thereof pivotally connected to said first pan member about a pivot axis in parallel spaced relation with said common axis, said pivot axis being intermediate the ends of both said first pan member and said frame member, the distal ends of said legs being connected to said second pan member by sliding pivots permitting said frame member to lie in nested relation within said pan members in the collapsed configuration of the accessory and to be disposed in angular relation with said pan members in the erected configuration of the accessory thereby to support the pan members in such erected configuration, the bight portion of said frame member being in the form of a cylindrical handle which is in substantial coaxial relation with said common axis when the accessory is in its collapsed configuration, said first pan member pivotally mounting a rear projection screen adjacent the other end thereof, a planar reflecting member pivotally mounted for swinging movement back and forth between a first position for intersecting the optical axis of an associated projector thereby to reflect an image to the rear of said screen and a second position in non-interfering relation with said optical axis, said screen and said reflecting surface each pivotal for being contained in said space when the accessory is in the collapsed configuration thereof.

4. A portable viewing accessory of the type which in use is supported adjacent the front of a projector, said accessory comprising, frame means including first, second and third frame members, said first and second frame members being pivotally connected together for swinging movement relative to each other thereby to establish collapsed and erected configurations of the accessory, said first and second frame members being constituted by respective housing shell halves which define a substantially enclosed housing when said members are swung to establish said collapsed configuration of the accessory, a planar reflecting element and a rear projection screen carried by said frame members and arranged such that the reflecting element obliquely intersects the projector optical axis for reflecting an image to the rear of said screen when the accessory is in the erected configuration thereof and positioned in front of the projector, said screen and said reflecting element being pivotally mounted by said frame members for being swung into generally parallel relation with each other and nested between said first and second frame members when the latter establish the collapsed configuration of the accessory, said third frame member being nestable within said first and second frame members in the collapsed configuration of the accessory, which third frame member has a portion arranged to serve as a carrying handle in both the collapsed and erected configurations of the accessory.

References Cited

UNITED STATES PATENTS

| | | | |
|---|---|---|---|
| 2,575,579 | 11/1951 | Bullock et al. | 352—34 |
| 2,583,467 | 1/1952 | Burleigh et al. | 350—123 |
| 2,730,011 | 1/1956 | Kleinhample et al. | 350—123 |

JOHN M. HORAN, Primary Examiner

M. H. HAYES, Assistant Examiner